(12) United States Patent
Chang et al.

(10) Patent No.: US 12,373,486 B2
(45) Date of Patent: Jul. 29, 2025

(54) AUDIO RECOGNITION METHOD, ELECTRONIC DEVICE AND STORAGE MEDIUM

(71) Applicants: Beijing Xiaomi Mobile Software Co., Ltd., Beijing (CN); Beijing Xiaomi Pinecone Electronics Co., Ltd., Beijing (CN)

(72) Inventors: Zhihua Chang, Beijing (CN); Chengzhen Duan, Bejing (CN); Ranran Hou, Bejing (CN); Bin Qin, Bejing (CN)

(73) Assignees: Beijing Xiaomi Mobile Software Co., Ltd., Beijing (CN); Beijing Xiaomi Pinecone Electronics Co., Ltd., Beijing (CN)

( * ) Notice: Subject to any disclaimer, the term of this patent is extended or adjusted under 35 U.S.C. 154(b) by 452 days.

(21) Appl. No.: 17/703,564

(22) Filed: Mar. 24, 2022

(65) Prior Publication Data
US 2023/0089870 A1    Mar. 23, 2023

(30) Foreign Application Priority Data
Sep. 22, 2021    (CN) .......................... 202111109177.1

(51) Int. Cl.
G06F 16/245    (2019.01)
G06F 16/632    (2019.01)
G06F 16/683    (2019.01)
G10L 15/16    (2006.01)

(52) U.S. Cl.
CPC .......... *G06F 16/634* (2019.01); *G06F 16/685* (2019.01); *G10L 15/16* (2013.01)

(58) Field of Classification Search
None
See application file for complete search history.

(56) References Cited

U.S. PATENT DOCUMENTS 11,106,730 B2 *   8/2021   Schalkwijk ............. G10L 25/54
2003/0236787 A1 * 12/2003  Burges .................. G06F 16/634
(Continued)

FOREIGN PATENT DOCUMENTS

CN   101504834 A    8/2009
CN   102956230 A    3/2013
(Continued)

OTHER PUBLICATIONS

Huixing, "Exploration and Practice of Meituan Intelligent Question Answering" (2020).

*Primary Examiner* — Seong-Ah A Shin
(74) *Attorney, Agent, or Firm* — Volpe Koenig (57) ABSTRACT

A method includes obtaining a query content. The query content includes segment information representing a to-be-recognized audio. The method further includes selecting the preset quantity of candidate audios corresponding to the query content from a preset library. Each candidate audio includes a candidate audio segment matched with the segment information. The method further includes inputting the candidate audio segment into a trained detection model so as to obtain target segment information including the segment information and a target audio where the target segment information is located.

11 Claims, 3 Drawing Sheets

(56) References Cited

U.S. PATENT DOCUMENTS

| | | | |
|---|---|---|---|
| 2008/0110322 A1* | 5/2008 | Lee | G10H 1/0008 84/611 |
| 2008/0270138 A1 | 10/2008 | Knight et al. | |
| 2009/0132077 A1* | 5/2009 | Fujihara | G06F 16/638 707/999.005 |
| 2010/0185607 A1* | 7/2010 | Shao | G06F 16/68 707/723 |
| 2010/0332500 A1* | 12/2010 | Pan | G06F 16/951 707/769 |
| 2011/0055213 A1* | 3/2011 | Ishizaki | G06F 16/4393 707/769 |
| 2012/0323559 A1* | 12/2012 | Ikeda | G10H 1/0008 704/9 |
| 2013/0006629 A1* | 1/2013 | Honda | G10L 15/187 704/E15.001 |
| 2013/0046536 A1 | 2/2013 | Lu et al. | |
| 2014/0278372 A1 | 9/2014 | Nakadai et al. | |
| 2016/0247512 A1* | 8/2016 | Duong | G06F 17/141 |
| 2017/0061988 A1* | 3/2017 | Nakano | G10L 13/02 |
| 2017/0068683 A1* | 3/2017 | Bakshi | G06F 16/245 |
| 2017/0097932 A1* | 4/2017 | Bakshi | G06F 16/9538 |
| 2018/0052908 A1* | 2/2018 | Liu | G06F 16/316 |
| 2019/0172465 A1* | 6/2019 | Lee | G10L 15/22 |
| 2019/0213279 A1* | 7/2019 | Kim | G06F 16/632 |
| 2019/0361982 A1 | 11/2019 | Jacobson et al. | |
| 2020/0034735 A1* | 1/2020 | Tsukuda | G06N 20/00 |
| 2020/0105274 A1 | 4/2020 | Joller et al. | |
| 2021/0090536 A1* | 3/2021 | Pachet | G10H 1/0025 |
| 2021/0191973 A1* | 6/2021 | Marchini | G06F 16/686 |
| 2021/0201863 A1* | 7/2021 | Bosch Vicente | G10H 1/36 |
| 2021/0337274 A1* | 10/2021 | Lee | H04N 21/4665 |
| 2023/0082955 A1* | 3/2023 | Stonehocker | G10L 15/32 704/235 |
| 2023/0252070 A1* | 8/2023 | Guo | G06N 3/04 707/722 |

FOREIGN PATENT DOCUMENTS

| | | |
|---|---|---|
| CN | 103559232 A | 2/2014 |
| CN | 104978962 A | 10/2015 |
| CN | 109346061 A | 2/2019 |
| CN | 111400543 A | 7/2020 |
| CN | 112530408 A | 3/2021 |
| WO | 2018/218034 A1 | 11/2018 |

* cited by examiner

AUDIO RECOGNITION METHOD, ELECTRONIC DEVICE AND STORAGE MEDIUM

CROSS REFERENCE TO RELATED APPLICATIONS

The present application claims the benefit of priority to Chinese Application No. 202111109177.1, filed on Sep. 22, 2021, the contents of which are incorporated herein by reference in their entireties for all purposes.

BACKGROUND

At present, the digital dissemination of music is becoming a popular trend, and users are accustomed to retrieving various kinds of rich and colorful music contents from the Internet. Currently, when there is a demand for retrieving and inquiring music, the users may obtain music based on a song title or a singer, etc. as retrieval conditions.

SUMMARY

The disclosure relates to the technical field of data processing, in particular to an audio recognition method, an electronic device and a storage medium. According to a first aspect of the disclosure an audio recognition method is provided and includes obtaining a query content. The query content includes segment information representing a to-be-recognized audio. The method further includes selecting a preset quantity of candidate audios corresponding to the query content from a preset library. Each candidate audio includes a candidate audio segment matched with the segment information. The method further includes inputting the candidate audio segment into a trained detection model so as to obtain target segment information including the segment information and a target audio where the target segment information is located.

According to a second aspect of the disclosure, an electronic device is provided. The electronic devices includes: a processor and a memory configured to store computer instructions executable by the processor. When the processor executes the instructions the processor is configured to obtain a query content. The query content includes segment information representing a to-be-recognized audio. The processor is further configured to select a preset quantity of candidate audios corresponding to the query content from a preset library. Each candidate audio includes a candidate audio segment matched with the segment information. The processor is further configured to input the candidate audio segment into a trained detection model so as to obtain target segment information including the segment information and a target audio where the target segment information is located.

According to a third aspect of the disclosure, a non-transitory computer readable storage medium is provided. When executable computer programs in the storage medium are executed by a processor, the processor is configured to obtain a query content. The query content includes segment information representing a to-be-recognized audio. The processor is further configured to select a preset quantity of candidate audios corresponding to the query content from a preset library. Each candidate audio includes a candidate audio segment matched with the segment information. The processor is further configured to input the candidate audio segment into a trained detection model so as to obtain target segment information including the segment information and a target audio where the target segment information is located.

It is understood that the above general descriptions and the following detailed descriptions are examples and explanatory and are not intended to limit the disclosure.

BRIEF DESCRIPTION OF THE DRAWINGS

The accompanying drawings, which are incorporated in and constitute a part of this specification, illustrate examples consistent with the disclosure and together with the specification serve to explain the principles of the disclosure.

DETAILED DESCRIPTION

In practical applications users often hear a piece of melody or a piece of song, such as watching a short video, mobile phone ringtones, etc., but don't know a song name or a singer or other information, resulting in the user being unable to inquire about the corresponding song. This inability reduces the use experience. The disclosure provides an audio recognition method, an electronic device and a storage medium, so as to solve the defects in the related art.

Examples will be described in detail herein, examples of which are illustrated in the accompanying drawings. When the following description refers to the accompanying drawings, the same numbers in different drawings represent the same or similar elements unless otherwise indicated. The examples described in the following examples do not represent all examples consistent with the disclosure. On the contrary, they are examples of an apparatus consistent with some aspects of the disclosure as detailed in the appended claims. It is noted that, in the case of no conflict, the features in the following examples and examples may be combined with each other.

At present, the digital dissemination of music is becoming a popular trend, and users are accustomed to retrieving various kinds of rich and colorful music contents from the Internet. Currently, when there is a demand for retrieving and inquiring music, the users may obtain music based on a song title or a singer, etc. as retrieval conditions. In practical applications, the users often hear a piece of melody or a piece of song, such as watching a short video, mobile phone ringtones, etc., but don't know a song name or a singer or other information, resulting in the inability of the users to inquire about the corresponding song. This inability reduces the use experience.

In order to solve the above technical problems an example of the disclosure provides an audio recognition method. The method may be implemented in an electronic device. The electronic device may include, but is not limited to mobile terminal devices or fixed terminal devices such as a tablet computer, a smart phone, a personal computer, a smart TV, a desktop computer, or a large screen. The method may also be applied to servers or server clusters.

Figure 1:
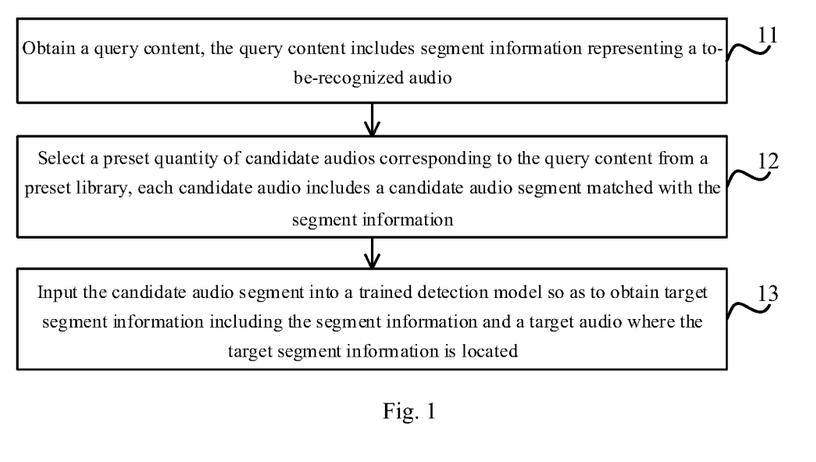
FIG. 1 is a flow chart of an audio recognition method illustrated according to an example.

FIG. 1 is a flow chart of an audio recognition method according to an example. Referring to FIG. 1, the audio recognition method includes step 11 to step 13. In step 11, a query content is obtained. The query content includes segment information representing a to-be-recognized audio.

In the example, an application program may be installed on the electronic device. Examples of application programs include self-contained music programs and third-party music programs (such as QQ Music, Kuwo Music, etc.), or any other application programs capable of performing a function of playing music. Users may listen to audio or watch video through one of the above application programs. When there is a need to query an audio, the query content may be input into the electronic device. The above query content may include, but is not limited to, text, voice, and pictures. In an example, in the process of music search, the most commonly used query method is text or voice.

For example, the electronic device or the application program may be provided with a search box. The users may input the query content in the search box. In practical applications the above query content may include at least one of a music name, a singer, a composer or segment information of the to-be-recognized audio, etc. The segment information may be part of morphemes in the to-be-recognized audio. The morpheme may be a character, word, phrase or long sentence formed by a plurality of words. Considering usage scenarios such as the user's desire to retrieve an original audio segment or audio name after hearing part of audio segments, the above query content may also include part of audio segments in a target audio, such as text or semantics corresponding to part of the audio segments. It is understood that the above target audio refers to an audio to which the original audio segment including part of the audio segments in the query content belongs, that is, the audio that needs to be retrieved.

With the continuous development of an Internet technology and the increasing demand of the users for search convenience, there are more and more applications of voice search. For example, search is performed by voice input of sentences such as "what song is the sparrow outside the window babbling on the telephone pole" or "play the sparrow outside the window babbling on the telephone pole". For another example, search may also be performed through pictures. When the audio segments are received, a screenshot may be taken and the screenshot may be input into the search box for audio search, or audio search may be performed by uploading a singer's album cover.

In step 12, a preset quantity of candidate audios corresponding to the query content are selected from a preset library. Each candidate audio includes a candidate audio segment matched with the segment information. In the example, the preset library may be pre-stored in the electronic device or in a cloud. The preset library includes a plurality of audios. Each audio may be all or a part of a piece of music. Each audio may create an index. The index may include audio auxiliary tag information. The auxiliary tag information may include but is not limited to text information, audio title, album, year, type, songwriter, singer and other auxiliary tag information of the audio. The index may be established manually or automatically by a computer. In the example, the preset library may include indexes of the plurality of audios, thereby reducing the occupation of storage space and improving the efficiency of reading and writing. In the example, the electronic device may select the preset quantity of candidate audios corresponding to the query content from the preset library.

Figure 2:
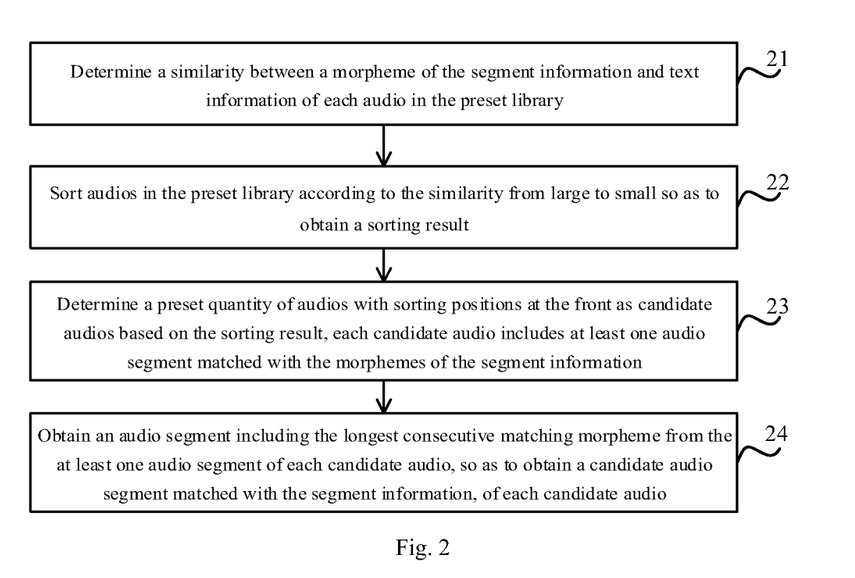
FIG. 2 is a flow chart of obtaining a candidate audio segment illustrated according to an example.

Referring to FIG. 2, steps 21 to 24 will now be described. In step 21, the electronic device may determine a similarity between a morpheme of the segment information in the query content and text information of each audio in the preset library. For example, the electronic device may split the audio segments in the query content to obtain a plurality of morphemes. Then, the electronic device may obtain the similarity between each morpheme and the text information in each audio index. The similarity between the segment information and the text information obtained in step 21 may be calculated by using a BM25 algorithm. A calculation process of the BM25 algorithm may refer to related technologies, details are not repeated herein.

In step 22, the electronic device may sort audios in the preset library according to the similarity from large to small so as to obtain a sorting result. Considering that an index order of magnitude in the preset library is larger (such as more than ten millions), the time used to sort all the indexes is longer. In some examples of the disclosure, only the preset quantity of candidate audios are used. For example, a tournament sorting algorithm may be used. When 25 audios are sorted, 3 audios with higher sorting similarity are obtained and the remaining audios are not sorted.

An example method includes the following steps. In Step 1, the 25 audios are divided into 5 groups, namely A1~A5, B1~B5, C1~C5, D1~D5, and E1~E5. Each group is sorted to obtain the audios with the largest similarity of each group. It is assumed that the order within each group is the same as a sequence number of each audio, that is, A1, A2, A3, A4 and A5 are sorted with the similarity from large to small in the group A. In Step 2, the audios (A1, B1, C1, D1, and E 1) with the greatest similarity in the 5 groups are sorted for the sixth time, and the audio A1 with the greatest similarity among the 25 audios is obtained. In Step 3, for the audios in the remaining groups, only A2, A3, B1, B2, and C1 have the opportunity to participate in the sorting. These five audios A2, A3, B1, B2, and C1 are sorted for the seventh time. The audios ranking the second and the third in similarity are obtained. The first, second and third-sorted audios are sorted from large to small. The other audios are sorted less than the third and have no sorting.

By adopting the tournament sorting algorithm, the audios in the preset library are sorted. That is, the preset quantity (such as N) of candidate audios with larger similarity are selected from the preset library. The sorting of other audios may be set to a preset identification (such as 0) to indicate that the audio sorting is located after N. This can reduce the amount of data processed by the electronic device and improve the retrieval speed of the electronic device.

In step 23 the electronic device may determine a preset quantity of audios with sorting positions at the front as the candidate audios based on the sorting result. That is, the device may select the preset quantity of audios from the audio with the largest similarity. Each candidate audio includes at least one audio segment matched with the morphemes of the segment information in the query content. When the tournament sorting algorithm is adopted, the electronic device may directly obtain audios with sorting identifications as the candidate audios.

In the process of obtaining the similarity, the similarity is calculated with respect to each morpheme in the query content and the text information of each audio, so the part of the audios in the preset library may be matched with at least one word in the query content. That is, each candidate audio includes at least one audio segment matched with the morphemes of the segment information in the query content.

In step 24 the electronic device may obtain an audio segment including the longest consecutive matching morpheme from the at least one audio segment of each candidate audio, so as to obtain the candidate audio segment matched with the segment information in the query content, of each candidate audio. Or, in step 24, the electronic device may select the longest audio segment from each candidate audio in the preset quantity of candidate audios, and may finally obtain N candidate audio segments.

Referring now to FIG. 1, in step 13, the candidate audio segment is input into a trained detection model so as to obtain target segment information including the segment information and a target audio where the target segment information is located. In the example, the trained detection model may be stored in the electronic device. The detection model may be a BERT model. The electronic device may acquire the target audio and the target segment information by using the above detection model.

Figure 3:
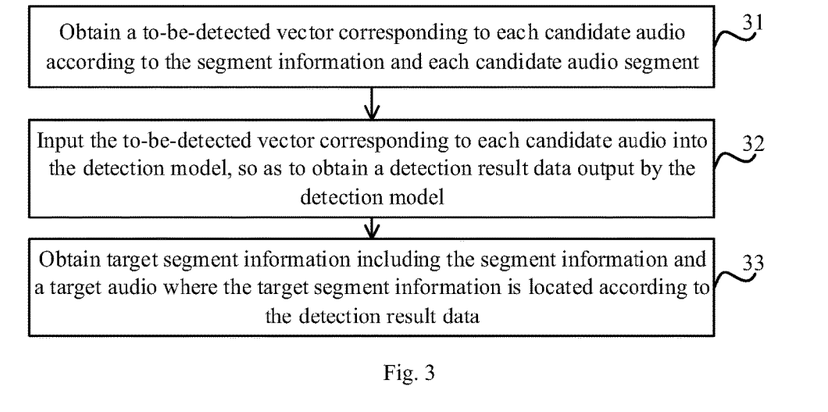
FIG. 3 is a flow chart of obtaining detection result data illustrated according to an example.

Referring to FIG. 3, the method includes step 31 to step 33. In step 31, the electronic device may obtain a to-be-detected vector corresponding to each candidate audio according to the segment information of the query content and each candidate audio segment. In this step, the electronic device may obtain the to-be-detected vector by splicing the segment information and each candidate audio segment. Each to-be-detected vector includes at least a first identifier and a second identifier. The first identifier is configured to identify a starting position of the to-be-detected vector. The second identifier is configured to identify a splicing position and an ending position of the to-be-detected vector. For example, "[cls] query content [seg] candidate audio segment lyrics [seg]" represents one to-be-detected vector, where [cls] represents the first identifier of the to-be-detected vector, and [seg] represents the second identifier of the to-be-detected vector.

In step 32, the electronic device may input the to-be-detected vector corresponding to each candidate audio into the detection model, so as to obtain a detection result data output by the detection model. The electronic device may call the detection model, input the to-be-detected vectors into the detection model in turn, and obtain the detection result data output by the detection model.

In step 33, the electronic device may obtain the target segment information including the segment information and the target audio where the target segment information is located according to the detection result data. In this step, the above detection result data include first probability data. The first probability data indicates each morpheme in the candidate audio segment in each to-be-detected vector is located at the starting position to be a starting morpheme. Second probability data indicates each morpheme in the candidate audio segment in each to-be-detected vector is located at the ending position to be an ending morpheme. Third probability data indicates whether a matched audio segment exists in the query content.

In the example, the electronic device may compare the starting position and the ending position. When the starting position is smaller than the ending position, the electronic device may determine a target audio segment from the candidate audio segment based on a product of the first probability data and the second probability data. For example, the electronic device may obtain the product of the first probability data and the second probability data of each to-be-detected vector, use the candidate audio segment with the largest product as the target audio segment, and use the target audio segment as target segment information recognized from the query content. It can be understood that, after determining the target audio segment, the electronic device may further determine auxiliary tag information corresponding to the target audio segment, and may determine the target audio according to the above auxiliary tag information.

In an example, after the electronic device obtains the target audio or the target audio segment, text information of the target audio or the target audio segment may be fed back to the users, so that the users conveniently read an above retrieval result. When the users want to listen to the target audio, the electronic device may obtain the corresponding audio data from a server through the application programs and buffer it for local playback.

In the solutions provided by the examples of the disclosure, the query content may be obtained. The query content includes segment information representing the to-be-recognized audio. Next, the preset quantity of candidate audios corresponding to the query content are selected from the preset library. Each candidate audio includes the candidate audio segment matched with the segment information. The candidate audio segment is input into the trained detection model so as to obtain the target segment information including the segment information and the target audio where the target segment information is located. Thus, in the example, the target audio segment and the target audio matched with each other are recognized from the preset library by using part of the segment information. Thus, the recognition efficiency is advantageously improved, and the use experience is improved.

Retrieving music is taken as an example of the disclosure. The working principle of the audio recognition method provided by the disclosure is described below with reference to FIG. 4 and FIG. 5. In the example, the electronic device may decompose a recognition task of the segment information in the query content into three parts. These are respectively, a Retriever, a Slicer and a Reader.

Figure 4:
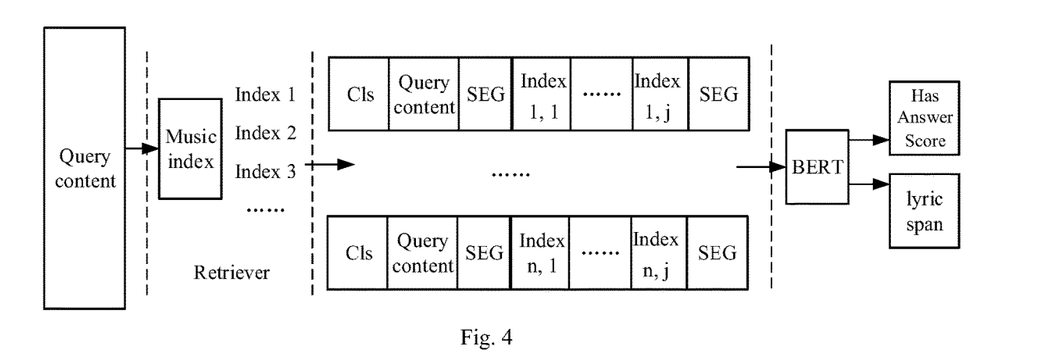
FIG. 4 is a flow chart of an audio recognition method illustrated according to an example.
Figure 5:
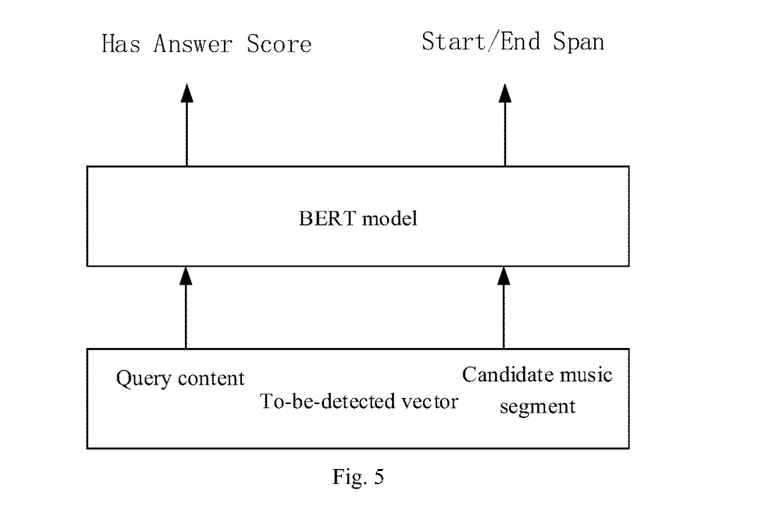
FIG. 5 is a flow chart of obtaining a target music segment illustrated according to an example.

In the Retriever part, the index of each piece of music is obtained. The index contains the music auxiliary tag information. Then, based on the index, the BM25 algorithm is used to calculate the similarity between the query content and the full text of each piece of music respectively, to obtain N pieces of candidate music. The music auxiliary tag information of the N pieces of candidate music with the highest correlation with the query content (that is, the similarity is larger) is recalled.

In the Slicer part, the music full text of the N pieces of candidate music with the highest correlation recalled by the index is truncated and filled up respectively to make each music segment form a complete music segment. Then, a music segment with the longest continuous matching words of each piece of candidate music is cut out, so as to obtain N candidate music segments. These N candidate music segments are respectively spliced with the query content and used as the input of a "Reader" model later. A splicing mode uses the mode of "[cls] query content [seg] candidate music segment [seg]" in FIG. 4 to obtain the to-be-detected vectors.

In the Reader part, the BERT model is adopted. The to-be-detected vectors obtained by the Slicer are sequentially input into the BERT model. The output of the BERT model contains two parts. The first is whether a music segment that meets the requirements (Has Answer Score) is contained or not. The second part is a specific music segment (lyric span).

Referring to FIG. 4, in the Has Answer Score part, the vector representation of the [CLS] position of the BERT model passes through an additional fully connected layer and a two-class Softmax to obtain the third probability data (Has Answer Score) with or without an answer. According to the third probability data and a preset probability threshold (may be 0.85~0.95, and may be set), a determination is made as to whether there is the music segment that meets the requirements. In the lyric span part, that is, the Start/End Span part in FIG. 5, the candidate music segment vector is calculated through the fully connected layer and Softmax to obtain the probability Pstart (that is, the first probability data) and Pend (that is, the second probability data) of each segment unit (Token) as a start word and an ending word of the answer. Then, a combination of the largest Pstart*Pend and the position of the starting word (START) smaller than the position of the ending word (END) is obtained. The text between the starting position (START) and the ending position (END) at this time is taken as a target music segment.

Figure 6:
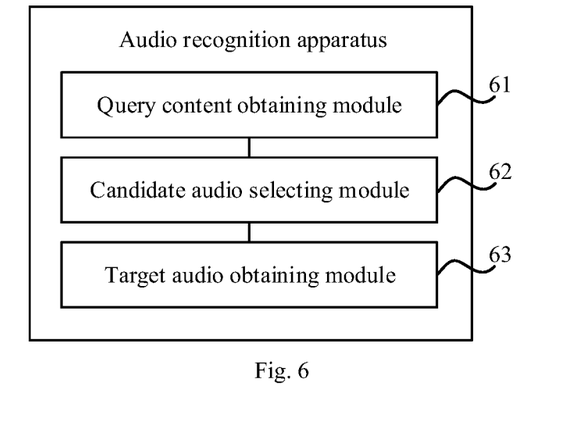
FIG. 6 is a block diagram of an audio recognition apparatus illustrated according to an example.

Based on the audio recognition method provided by the above example, an example of the disclosure further provides an audio recognition apparatus. Referring to FIG. 6, the apparatus is shown to include: a query content obtaining module 61. The query content module 61 is configured to obtain a query content. The query content includes segment information representing the to-be-recognized audio.

A candidate audio selecting module 62 is configured to select the preset quantity of candidate audios corresponding to the query content from a preset library. Each candidate audio includes a candidate audio segment matched with the segment information. A target audio obtaining module 63, is configured to input the candidate audio segment into a trained detection model so as to obtain target segment information including the segment information and a target audio where the target segment information is located.

In an example, the candidate audio selecting module includes: a similarity determining submodule configured to determine a similarity between a morpheme of the segment information and text information of each audio in the preset library. The candidate audio selecting module further includes a sorting result-obtaining submodule configured to sort audios in the preset library according to the similarity from large to small so as to obtain a sorting result. An audio segment-obtaining submodule is configured to determine the preset quantity of audios with sorting positions at the front as the candidate audios based on the sorting result. Each candidate audio includes at least one audio segment matched with the morpheme of the segment information.

A candidate segment obtaining submodule is configured to obtain an audio segment including the longest consecutive matching morpheme from the at least one audio segment of each candidate audio, so as to obtain the candidate audio segment, matched with the segment information, of each candidate audio.

In an example, the target audio obtaining module includes: a to-be-detected vector obtaining submodule configured to obtain a to-be-detected vector corresponding to each candidate audio according to the segment information and the candidate audio segment; a detection result obtaining submodule configured to input the to-be-detected vector corresponding to each candidate audio into the detection model, so as to obtain a detection result data output by the detection model; and a target audio obtaining submodule, configured to obtain the target segment information including the segment information and the target audio where the target segment information is located according to the detection result data.

In an example, the to-be-detected vector obtaining submodule includes a to-be-detected vector obtaining unit configured to splice the segment information with the candidate audio segment of each candidate audio respectively, so as to obtain the to-be-detected vector corresponding to each candidate audio. Each to-be-detected vector at least includes a first identifier and a second identifier. The first identifier is configured to identify a starting position of the to-be-detected vector. The second identifier is configured to identify a splicing position and an ending position of the to-be-detected vector.

In an example, the detection result data include first probability data and second probability data which correspondingly indicate that each morpheme in the candidate audio segment is located at the starting position and the ending position respectively.

The target audio obtaining submodule includes a target segment obtaining unit configured to determine, in a case that the starting position is smaller than the ending position, a target audio segment from the candidate audio segment based on a product of the first probability data and the second probability data. Further included is a target audio obtaining unit configured to use the target audio segment as the target segment information recognized from the query content, and to use an audio where the target segment information is located as the target audio.

In an example, the target segment obtaining unit includes a morpheme determining subunit configured to determine a starting morpheme at the starting position and an ending morpheme at the ending position when the product of the first probability data and the second probability data is the largest. Further included is a segment determining subunit configured to determine that all morphemes between the starting morpheme and the ending morpheme constitute the target audio segment.

In an example, the to-be-recognized audio is a song. The segment information refers to part of lyrics in the song. It is noted that the apparatus and device shown in the apparatus example are matched with contents of the method example. The description of the apparatus may refer to the description of the above method examples, which will not be repeated herein.

Figure 7:
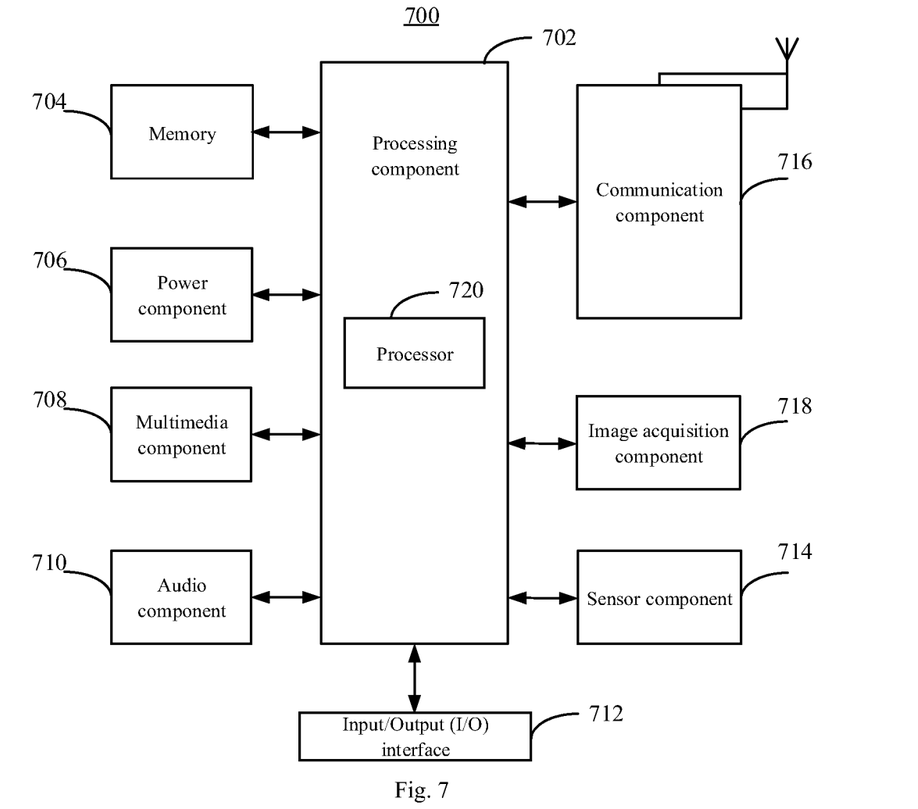
FIG. 7 is a block diagram of an electronic device illustrated according to an example.

FIG. 7 is a block diagram of an electronic device illustrated according to an example. The electronic device 700 may be a mobile phone, a computer, a digital broadcast terminal, a tablet, a medical device, exercise equipment, a personal digital assistant, and the like. It can be understood that the above electronic device may be used as a first device or a second device.

Referring to FIG. 7, the electronic device 700 may include one or more of the following components: a processing component 702, a memory 704, a power component 706, a multimedia component 708, an audio component 710, an Input/Output (I/O) interface 712, a sensor component 714, a communication component 716, and an image acquisition component 718.

The processing component 702 typically controls overall operations of the electronic device 700, such as operations associated with display, telephone calls, data communications, camera operations, and recording operations. The processing component 702 may include one or a plurality of processors 720 to execute computer programs. In addition, the processing component 702 may include one or a plurality of modules to facilitate the interaction between the processing component 702 and other components. For example, the processing component 702 may include a multimedia module to facilitate the interaction between the multimedia component 708 and the processing component 702.

The memory 704 is configured to store various types of data to support operations at the electronic device 700. Examples of such data include computer programs for any applications or methods operated on the electronic device 700, contact data, phonebook data, messages, pictures, video, etc. The memory 704 may be implemented by any type of volatile or non-volatile memory devices or combinations of them, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic disk or a compact disk.

The power component 706 provides power for various components of the electronic device 700. The power component 706 may include a power management system, one or more power sources, and any other components associated with the generation, management and distribution of power for the electronic device 700. The power component 706 may include a power chip, a controller may communicate with the power chip, so as to control the power chip to turn on or off a switching apparatus, so that a battery supplies power to or does not supply power to a main board circuit.

The multimedia component 708 may include a screen providing an output interface between the electronic device 700 and a target object. In some examples, the screen may include a liquid crystal display (LCD) and a touch panel (TP). When the screen includes the TP, the screen may be implemented as a touch screen to receive an input signal from the target object. The touch panel includes one or more touch sensors to sense touch, sliding, and gestures on the touch panel. The touch sensors may not only sense a boundary of the touch or sliding action, but also detect duration and pressure related to the touch or sliding operation.

The audio component 710 is configured to output and/or input audio file information. For example, the audio component 710 includes a Microphone (MIC) configured to receive external audio file information when the electronic device 700 is in an operation mode, such as a call mode, a recording mode, and a voice recognition mode. The received audio file information may be further stored in the memory 704 or sent via the communication component 716. In some examples, the audio component 710 further includes a speaker configured to output the audio file information.

The I/O interface 712 provides an interface between the processing component 702 and peripheral interface modules, such as a keyboard, a click wheel, or buttons, and the like.

The sensor component 714 includes one or more sensors configured to provide status assessments of various aspects of the electronic device 700. For example, the sensor component 714 may detect an opened/closed state of the electronic device 700 and the relative positioning of the components such as a display and a keypad of the electronic device 700, and the sensor component 714 may also detect the position change of the electronic device 700 or a component, the presence or absence of contact between the target object and the electronic device 700, the orientation or acceleration/deceleration of the electronic device 700, and the temperature change of the electronic device 700. In the example, the sensor component 714 may include a magnetic sensor, a gyroscope and a magnetic field sensor, and the magnetic field sensor includes at least one of a Hall sensor, a thin-film magneto-resistive sensor, or a magnetic liquid acceleration sensor.

The communication component 716 is configured to facilitate wired or wireless communication between the electronic device 700 and other devices. The electronic device 700 may access a wireless network based on a communication standard, such as WiFi, 2G, 3G, 4G, 5G, or combinations of them. In one example, the communication component 716 receives broadcast information or broadcast related information from an external broadcast management system via a broadcast channel. In one example, the communication component 716 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology and other technologies.

In examples, the electronic device 700 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements.

In examples, there is also provided a non-transitory computer readable storage medium including executable computer programs, such as the memory 704 including instructions. The above executable compute programs may be executed by a processor. The computer readable storage medium may be a Read Only Memory (ROM), a Random Access Memory (RAM), a Compact Disc Read Only Memory (CD-ROM), a magnetic tape, a floppy disk, an optical data storage device, and the like.

Other implementations of the disclosure will be apparent to those skilled in the art from consideration of the specification and practice of the disclosure herein. The disclosure is intended to cover any variations, uses, or adaptations following the general principles of the disclosure and including such departures from the disclosure as come within known or customary practice in the art. It is intended that the specification and examples be considered as illustrative.

It will be appreciated that the disclosure is not limited to the exact construction that has been described above and illustrated in the accompanying drawings, and that various modifications and changes may be made without departing from the scope of the disclosure. It is intended that the scope of the disclosure be limited by the appended claims.

What is claimed is:

1. An audio recognition method, performed by an electronic device, comprising:
   obtaining a query content, wherein the query content comprises segment information representing a to-be-recognized audio;
   selecting a preset quantity of candidate audios corresponding to the query content from a preset library, wherein the candidate audio comprises a candidate audio segment matched with the segment information;
   obtaining a to-be-detected vector corresponding to the candidate audio according to the segment information and the candidate audio segment;
   inputting the to-be-detected vector corresponding to the candidate audio into a trained detection model, so as to obtain a detection result data output by the trained detection model; and obtaining target segment information comprising the segment information and a target audio where the target segment information is located according to the detection result data;

wherein the detection result data comprise first probability data and second probability data which correspondingly indicate that a morpheme in the candidate audio segment is located at a starting position and an ending position respectively, and wherein:

obtaining the target segment information comprising the segment information and the target audio where the target segment information is located according to the detection result data comprises:

determining, in response to determining that the starting position is smaller than the ending position, a target audio segment from the candidate audio segment based on a product of the first probability data and the second probability data; and using the target audio segment as the target segment information recognized from the query content, and using an audio where the target segment information is located as the target audio;

wherein determining the target audio segment from the candidate audio segment based on the product of the first probability data and the second probability data comprises:

determining a starting morpheme at the starting position and an ending morpheme at the ending position when the product of the first probability data and the second probability data is the largest; and determining that all morphemes between the starting morpheme and the ending morpheme constitute the target audio segment.

2. The method according to claim 1, wherein selecting the preset quantity of the candidate audios corresponding to the query content from the preset library comprises:

determining a similarity between a morpheme of the segment information and text information of an audio in the preset library;

sorting audios in the preset library according to the similarity from large to small so as to obtain a sorting result;

determining a preset quantity of audios with sorting positions at the front as the candidate audios based on the sorting result, the candidate audio comprising at least one audio segment matched with the morphemes of the segment information; and obtaining an audio segment comprising the longest consecutive matching morpheme from the at least one audio segment of the candidate audio, so as to obtain the candidate audio segment, matched with the segment information, of the candidate audio.

3. The method according to claim 1, wherein obtaining the to-be-detected vector corresponding to the candidate audio according to the segment information and the candidate audio segment comprises:

splicing the segment information with the candidate audio segment of the candidate audio respectively, so as to obtain the to-be-detected vector corresponding to the candidate audio, and wherein the to-be-detected vector at least comprises a first identifier and a second identifier, the first identifier is configured to identify a starting position of the to-be-detected vector, and the second identifier is configured to identify a splicing position and an ending position of the to-be-detected vector.

4. The method according to claim 1, wherein the to-be-recognized audio is a song, and the segment information refers to part of lyrics in the song.

5. An electronic device, comprising:
a processor; and
a memory configured to store computer instructions executable by the processor;

wherein, when the processor executes the instructions the processor is configured to:

obtain a query content, wherein the query content comprises segment information representing a to-be-recognized audio;

select a preset quantity of candidate audios corresponding to the query content from a preset library, wherein the candidate audio comprises a candidate audio segment matched with the segment information;

obtain a to-be-detected vector corresponding to the candidate audio according to the segment information and the candidate audio segment;

input the to-be-detected vector corresponding to the candidate audio into a trained detection model, so as to obtain a detection result data output by the trained detection model; and obtain target segment information comprising the segment information and a target audio where the target segment information is located according to the detection result data;

wherein the detection result data comprise first probability data and second probability data which correspondingly indicate that a morpheme in the candidate audio segment is located at a starting position and an ending position respectively; and wherein the processor is further configured to:

determine, in response to determining that the starting position is smaller than the ending position, a target audio segment from the candidate audio segment based on a product of the first probability data and the second probability data; and use the target audio segment as the target segment information recognized from the query content, and using an audio where the target segment information is located as the target audio;

wherein the processor is further configured to:

determine a starting morpheme at the starting position and an ending morpheme at the ending position when the product of the first probability data and the second probability data is the largest; and determine that all morphemes between the starting morpheme and the ending morpheme constitute the target audio segment.

6. The electronic device according to claim 5, wherein the processor is further configured to:

determine a similarity between a morpheme of the segment information and text information of an audio in the preset library;

sort audios in the preset library according to the similarity from large to small so as to obtain a sorting result;

determine a preset quantity of audios with sorting positions at the front as the candidate audios based on the sorting result, the candidate audio comprising at least one audio segment matched with the morphemes of the segment information; and obtain an audio segment comprising the longest consecutive matching morpheme from the at least one audio segment of the candidate audio, so as to obtain the candidate audio segment, matched with the segment information, of the candidate audio.

7. The electronic device according to claim 5, wherein the processor is further configured to:
splice the segment information with the candidate audio segment of the candidate audio respectively, so as to obtain the to-be-detected vector corresponding to the candidate audio, and
wherein the to-be-detected vector at least comprises a first identifier and a second identifier, and wherein the first identifier is configured to identify a starting position of the to-be-detected vector, and the second identifier is configured to identify a splicing position and an ending position of the to-be-detected vector.

8. The electronic device according to claim 5, wherein the to-be-recognized audio is a song, and the segment information refers to part of lyrics in the song.

9. A non-transitory computer readable storage medium, wherein when executable computer programs in the storage medium are executed by a processor, the processor is configured to:
obtain a query content, wherein the query content comprises segment information representing a to-be-recognized audio;
select a preset quantity of candidate audios corresponding to the query content from a preset library, wherein the candidate audio comprises a candidate audio segment matched with the segment information;
obtain a to-be-detected vector corresponding to the candidate audio according to the segment information and the candidate audio segment;
input the to-be-detected vector corresponding to the candidate audio into a trained detection model, so as to obtain a detection result data output by the trained detection model; and
obtain target segment information comprising the segment information and a target audio where the target segment information is located according to the detection result data;
wherein the detection result data comprise first probability data and second probability data which correspondingly indicate that a morpheme in the candidate audio segment is located at a starting position and an ending position respectively; and
when executable computer programs in the storage medium are executed by the processor, the processor is configured to:
determine, in response to determining that the starting position is smaller than the ending position, a target audio segment from the candidate audio segment based on a product of the first probability data and the second probability data; and
use the target audio segment as the target segment information recognized from the query content, and using an audio where the target segment information is located as the target audio;
wherein when executable computer programs in the storage medium are executed by the processor, the processor is configured to:
determine a starting morpheme at the starting position and an ending morpheme at the ending position when the product of the first probability data and the second probability data is the largest; and
determine that all morphemes between the starting morpheme and the ending morpheme constitute the target audio segment.

10. The non-transitory computer readable storage medium according to claim 9, wherein when executable computer programs in the storage medium are executed by the processor, the processor is configured to:
determine a similarity between a morpheme of the segment information and text information of an audio in the preset library;
sort audios in the preset library according to the similarity from large to small so as to obtain a sorting result;
determine a preset quantity of audios with sorting positions at the front as the candidate audios based on the sorting result, the candidate audio comprising at least one audio segment matched with the morphemes of the segment information; and
obtain an audio segment comprising the longest consecutive matching morpheme from the at least one audio segment of the candidate audio, so as to obtain the candidate audio segment, matched with the segment information, of the candidate audio.

11. The non-transitory computer readable storage medium according to claim 9, wherein when executable computer programs in the storage medium are executed by the processor, the processor is configured to:
splice the segment information with the candidate audio segment of the candidate audio respectively, so as to obtain the to-be-detected vector corresponding to the candidate audio, and
wherein the to-be-detected vector at least comprises a first identifier and a second identifier, the first identifier is configured to identify a starting position of the to-be-detected vector, and the second identifier is configured to identify a splicing position and an ending position of the to-be-detected vector.

* * * * *

UNITED STATES PATENT AND TRADEMARK OFFICE
CERTIFICATE OF CORRECTION

| | | |
|---|---|---|
| PATENT NO. | : 12,373,486 B2 | Page 1 of 1 |
| APPLICATION NO. | : 17/703564 | |
| DATED | : July 29, 2025 | |
| INVENTOR(S) | : Zhihua Chang et al. | |

It is certified that error appears in the above-identified patent and that said Letters Patent is hereby corrected as shown below:

In the Specification

In Column 2, Line 36, delete "use" and insert -- user --, therefor.
In Column 2, Line 62, delete "use" and insert -- user --, therefor.
In Column 4, Line 34, delete "E 1)" and insert -- E1) --, therefor.
In Column 6, Line 10, delete "users" and insert -- users can --, therefor.
In Column 6, Line 29, delete "use" and insert -- user --, therefor.
In Column 10, Line 30, delete "compute" and insert -- computer --, therefor.

Signed and Sealed this
Thirtieth Day of September, 2025

John A. Squires
*Director of the United States Patent and Trademark Office*